(12) United States Patent
Elmer (10) Patent No.: US 6,530,627 B2
(45) Date of Patent: Mar. 11, 2003

(54) GLASS DISPLAY CASE BEING HELD TOGETHER BY CLAMPING FITTINGS AND A CLAMPING FITTING FOR THE CORNER CONNECTION OF THREE ADJOINING WALLS, ESPECIALLY GLASS PANES IN GLASS DISPLAY CASES AND A METHOD FOR USING A KIT TO MAKE A GLASS DISPLAY CASE

(75) Inventor: Hubert Elmer, Innsbruck (AT)

(73) Assignee: DORMA GmbH + Co. KG, Ennepetal (DE)

( * ) Notice: Subject to any disclaimer, the term of this patent is extended or adjusted under 35 U.S.C. 154(b) by 0 days.

(21) Appl. No.: 09/854,411

(22) Filed: May 11, 2001

(65) Prior Publication Data

US 2002/0074907 A1 Jun. 20, 2002

Related U.S. Application Data

(63) Continuation-in-part of application No. PCT/EP00/08066, filed on Aug. 18, 2000.

(30) Foreign Application Priority Data

Sep. 13, 1999 (DE) .......................................... 199 43 565

(51) Int. Cl.[7] ............................................... F16B 12/00
(52) U.S. Cl. ........................ 312/140; 403/170; 403/403
(58) Field of Search ................................. 403/169, 170, 403/171, 176, 217, 218, 403; 312/114, 140, 257.1, 263, 265.5

(56) References Cited

FOREIGN PATENT DOCUMENTS

| DE | 192082 | * 9/1957 | ................. 312/140 |
| DE | 29720336 | 4/1998 | |
| GB | 302950 | * 12/1928 | ................. 312/140 |
| WO | 0784129 | 7/1997 | |

* cited by examiner

*Primary Examiner*—Janet M. Wilkens
(74) *Attorney, Agent, or Firm*—Nils H. Ljungman & Associates (57) ABSTRACT

A glass display case being held together by clamping fittings and a clamping fitting for the corner connection of three adjoining wall structures, especially glass panes or the like. The clamping fitting presents a central coupling member, to which are associated three rotatable and lockable connecting axles, the center longitudinal axes of which respectively stretch out or extend radially with regard to the coupling member at an angle of approximately 120 degrees from one another. At their free end opposite to the coupling member, the connecting axles present a stiffening connector articulation for the connection to an adapter element.

20 Claims, 5 Drawing Sheets

GLASS DISPLAY CASE BEING HELD TOGETHER BY CLAMPING FITTINGS AND A CLAMPING FITTING FOR THE CORNER CONNECTION OF THREE ADJOINING WALLS, ESPECIALLY GLASS PANES IN GLASS DISPLAY CASES AND A METHOD FOR USING A KIT TO MAKE A GLASS DISPLAY CASE

CONTINUING APPLICATION DATA

This application is a Continuation-In-Part application of International Patent Application No. PCT/EP00/08066, filed on Aug. 18, 2000, which claims priority from Federal Republic of Germany Patent Application No. 199 43 565.0, filed on Sep. 13, 1999. International Patent Application No. PCT/EP00/08066 was pending as of the filing date of this application. The United States was an elected state in International Patent Application No. PCT/EP00/08066.

BACKGROUND OF THE INVENTION

1. Field of the Invention

The invention relates to a glass display case being held together by clamping fittings and a clamping fitting for the corner connection of three adjoining wall structures, especially glass panes or the like.

The invention also relates to a clamping fitting for the corner connection of three adjoining walls, especially glass panes or the like.

2. Background of the Invention

European Patent Application No. 0 784 129 A1 deals with a suspension device for the connection of four adjacent single glass panes arranged in-plane. This is not a corner connection like the species described hereafter. In European Patent Application No. 0 784 129 A1, a suspension member is used comprising four arms stretching out from a central attachment body, including the structure attachment, at the arms' free ends, of which the glass panes are suspended. The glass panes' connection at the arms' free ends is realized, in well-known manner, via glass adapter elements, whereby lens-like supporting members are arranged for the necessary tolerance compensation between the glass adapter elements and the arms' free ends.

On the contrary to the above description, the present invention relates to a corner connection of three walls or wall structures, especially glass panes, which are not exposed in-plane, but are arranged towards each other at an angle, for example, at a right angle. Such corner connections are required, for example, when conceiving large volume glass showcases or glass display cases. For this purpose, aesthetically appealing connection components are desired. In other words, the connection means should not detract from a glass display case or its holdings. The connection means should especially allow for tolerance compensation between the adjoining glass panes, tolerances being caused, for example, by different dimensions of the glass panes or by tolerances of the boreholes or of the apertures arranged, in well-known manner, in the panes for the connection with the respective adapter element of the clamping fitting. Moreover, the inventive clamping fitting should make possible corner connections where the wall structures, preferably glass panes, can be interconnected when their relative position towards each other includes angles of more or less than 90 degrees.

OBJECT OF THE INVENTION

The object of the invention is to propose a clamping fitting belonging to the aforementioned species meeting the specified criteria.

SUMMARY OF THE INVENTION

The invention solves the given problem in a clamping fitting for the corner connection of three adjoining walls, especially glass panes or the like. The clamping fitting can present a central coupling member with three locating bearings for the connecting axles, therein rotatably and lockably supported. Each axle has a center longitudinal axis that runs radially with regard to the coupling member and respectively include between each axle an angle of approximately 120 degrees. The connecting axles can present, at their free end opposite to the coupling member, a connector articulation that can be made rigid for the connection of an adapter element, preferably a glass adapter element. Further features of the invention are described herein below.

According to the above technical teaching, the clamping fitting presents a central coupling member with three locating bearings with therein rotatably and lockably supported connecting axles, the center longitudinal axes of which run radially from the coupling member and respectively include between each other an angle of approximately 120 degrees, whereby, at their free end opposite to the coupling member, the connecting axles present a connector articulation that can be stiffened for the attachment of an adapter element, preferably a glass adapter element. Thanks to the rotating support of the connecting axles in the locating bearings of the central coupling member on the one hand, and to the connector articulation between the connecting axles and the adapter element on the other hand, with regard to the whole clamping fitting, virtually three universal joints are realized, which can allow for essentially complete adjustment of the respective adapter element towards the glass panes to be connected, regardless of their angle positions towards each other. Substantially simultaneously, the front edges of the glass panes facing each other can essentially be precisely adjusted, whereby, once the adjustment is realized, the position of the connecting axle in the respective locating bearing of the central coupling member, as well as the position of the connector articulation between the connecting axle and the adapter element, can be made rigid. In one possible embodiment, the above positioning can be made rigid by tightening the respective clamp screws and threaded pins.

The central coupling member could principally comprise a disc or a disc-shaped body containing the locating bearings, but it can be preferably realized as a sphere or a sphere-shaped body, whereby the locating bearings are executed as three pocket borings displaced at angles of about 120 degrees from one another.

Locking the connecting axle in the central coupling member can be preferably realized in such a way that the connecting axles are rotatably supported with an axle journal presenting an undercut groove in the locating bearing of the coupling member. The connecting axles are lockable by means of a threaded pin that is inserted into the coupling member and engages the groove. By this means, an aesthetically appealing and simple locking of the connecting axle with regard to the central coupling member is achieved.

In an advantageous embodiment of the invention, the connector articulation between the connecting axles and the adapter elements can be realized in such a way that the connector articulation of the connecting axles is made of a bracket, which presents an oblong hole and engages into a fork of the adapter element. The oblong hole in the bracket of the connecting axles allows for additional tolerance compensation through respectively differently configured lengths of the individual connecting brackets, prior to stiffening of the connector articulation.

In further execution of the invention, in order to stiffen the connector articulation, the connector articulation can be conceived so that one fork leg of the adapter element's fork presents a borehole with a female thread and the other fork leg presents an indentation for the reception of a clamp screw. In addition, the clamp screw can fit into the indentation and the borehole in the respective fork legs of the fork of the articulating connector, and can pass through the oblong hole in the bracket of the connecting axle to connect them. The connector articulation can be stiffened when the clamp screw is tightened.

The invention results in the realization of a clamping fitting for the corner connection of three adjoining wall structures, which can provide not only a corner connection of substantially high stability, but also one which is especially suitable to realize, with sufficient possible tolerance compensation, the corner connection of adjoining panes, if these panes are inclined towards each other at different angle positions. In addition, the invention can substantially reduce the need for numerous connecting devices, thus essentially affording a less-obstructed and more attractive view of a glass display case and its holdings.

In at least one possible embodiment, the invention relates to the formation of a clamping fitting for the corner connection of three adjoining wall structures, especially glass panes or the like, comprising a central coupling member, the central coupling member comprising three locating structures, three protruding elements, the three protruding elements being rotatably and lockably supported in the three locating structures of the central coupling member, each of the three protruding elements being configured to have a center longitudinal axis extending radially from the coupling member, the coupling member and the three protruding elements being configured to be disposed such that the center longitudinal axes are at an angle of approximately 120 degrees with respect to one another, the three protruding elements comprising three free ends disposed opposite to the coupling member, three articulating connectors, the three free ends of the three protruding elements being attached to the three articulating connectors, each of the three articulating connectors forming an articulating connection with its corresponding protruding element, three fastening elements being configured to attach to an adjoining wall structure, the three articulating connectors being attached to the three fastening elements, three elements configured to selectively rigidly connect the three articulating connectors with their corresponding protruding elements.

In at least one possible embodiment, the invention also relates to a kit to make a clamping fitting for the corner connection of three adjoining wall structures, especially glass panes or the like, comprising a central coupling member, the central coupling member comprising locating structures, protruding elements, the protruding elements being configured to be rotatably and lockably supported in the locating structures of the central coupling member, the protruding elements being configured to have center longitudinal axes extending radially from the coupling member, the coupling member and the protruding elements being configured to be disposed such that the center longitudinal axes are at an angle of approximately 120 degrees with respect to one another, the protruding elements comprising free ends configured to be disposed opposite to the coupling member, articulating connectors, the free ends of the protruding elements being configured to attach to the articulating connectors, the articulating connectors being configured to form an articulating connection with the protruding elements, fastening elements being configured to attach to an adjoining wall structure, the articulating connectors being configured to attach to the fastening elements, elements configured to selectively rigidly connect the articulating connectors with their corresponding protruding elements.

In at least one possible embodiment, the invention further relates to a method of using a kit comprising a clamping fitting for the corner connection of three adjoining glass wall structures to build a glass display case, the kit comprising a central coupling member, the central coupling member comprising locating structures, protruding elements, the protruding elements being configured to be rotatably and lockably supported in the locating structures of the central coupling member, the protruding elements being configured to have center longitudinal axes extending radially from the coupling member, the coupling member and the protruding elements being configured to be disposed such that the center longitudinal axes are at an angle of approximately 120 degrees with respect to one another, the protruding elements comprising free ends configured to be disposed opposite to the coupling member, articulating connectors, the free ends of the protruding elements being configured to attach to the articulating connectors, the articulating connectors being configured to form an articulating connection with the protruding elements, fastening elements being configured to attach to an adjoining wall structure, the articulating connectors being configured to attach to the fastening elements, elements configured to selectively rigidly connect the articulating connectors with their corresponding protruding elements; the glass display case comprising at least three glass panes, the at least three glass panes being configured to be disposed adjacent to one another to form an inner corner in the glass display case, each of the at least three glass panes comprising holes being configured to receive and connect to one of the fastening elements, the fastening elements being configured to connect the at least three glass panes together; the method comprising the steps of: attaching the protruding elements to the locating structures of the coupling member so that the center longitudinal axes of the protruding elements are disposed at an angle of approximately 120 degrees with respect to one another and the free ends of the protruding elements are disposed opposite to the coupling member, fitting the protruding elements into the articulating connectors, inserting the selectively rigidly connecting elements into their corresponding articulating connectors and protruding elements, arranging the glass panes of the glass display case so that the glass panes are disposed adjacent to one another to form an inner corner in the glass display case, aligning the articulating connectors with the holes in the at least three glass panes, inserting the fastening elements into the holes in the at least three glass panes, attaching the fastening elements to the articulating connectors, to build a glass display case.

The above-discussed embodiments of the present invention will be described further herein below. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Hereinafter, the invention is explained in detail on the basis of an embodiment example. Additional possible embodiments are also shown. They show.

DESCRIPTION OF THE PREFERRED EMBODIMENT

Figure 1:
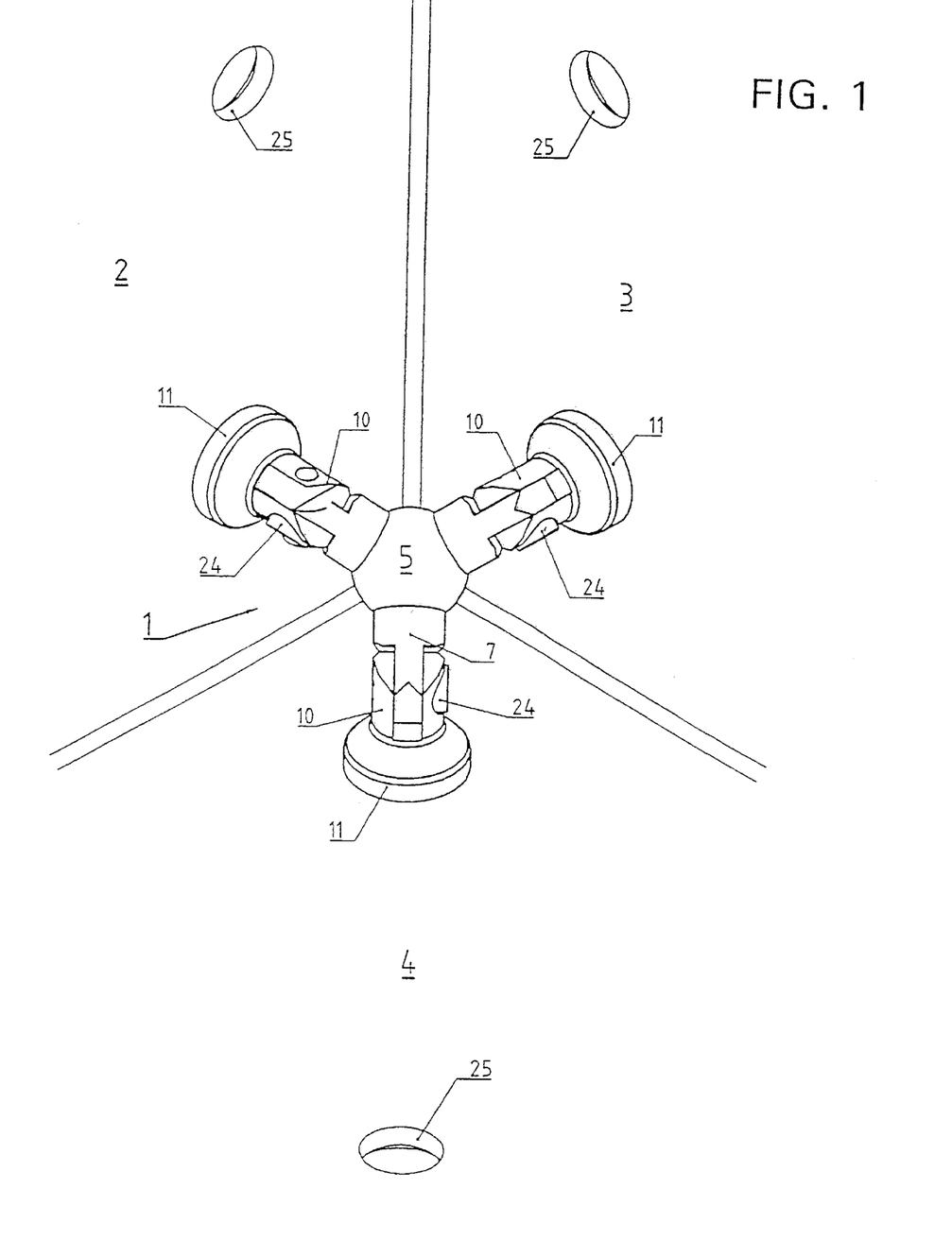
FIG. 1: A general view of the clamping fitting in a perspective representation.

According to FIG. 1 in the embodiment example, a clamping fitting 1 connects three glass panes 2, 3, 4 arranged at right angles to each other. The clamping fitting 1 basically presents a central coupling member 5, associated to which are three connecting axles 7, respectively displaced at about 120 degrees from one another, which are rotatably, however lockably, supported in the central coupling member 5. The glass adapter elements 11, screwed into the apertures 25 in the glass panes 2, 3, 4, are linked to the connecting axles 7 by means of connector articulations 10, which are capable of stiffening by means of a clamp screw 24.

Figure 2:
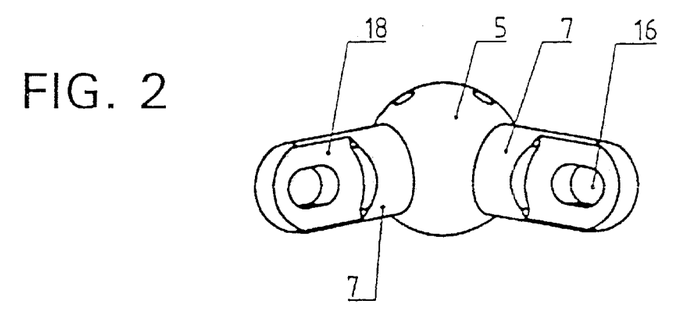
FIG. 2: A perspective view of the central coupling member with the connecting axles.
Figure 3:
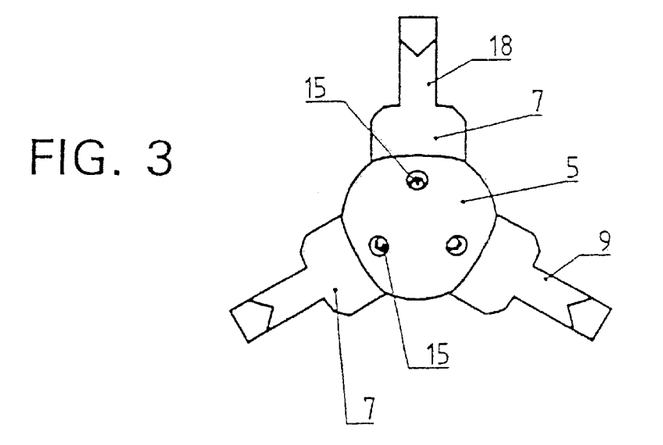
FIG. 3: A top view of the representation according to FIG. 2.
Figure 4:
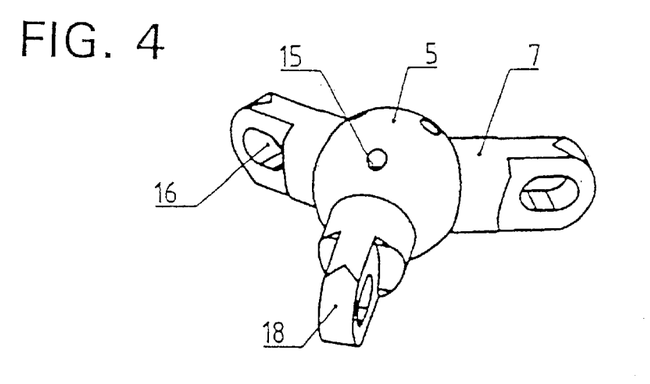
FIG. 4: A perspective top view on the representation according to FIG. 3.
Figure 5:
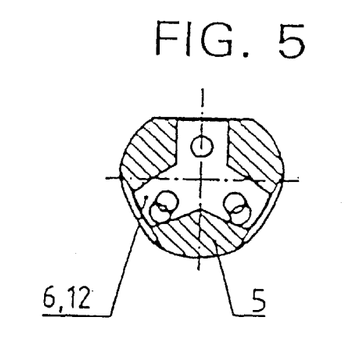
FIG. 5: A sectional view of the central coupling member.

FIGS. 2 to 4 illustrate that the connecting axles 7 may be locked with regard to the central coupling member 5, executed as a sphere-shaped body, by threaded pins 15, which are screwed into the central coupling member 5. As FIG. 5 shows, locating bearings 6, provided in the central coupling member 5, are realized as pocket borings 12, into which axle journals 14 of the connecting axles 7 engage.

Figure 6:
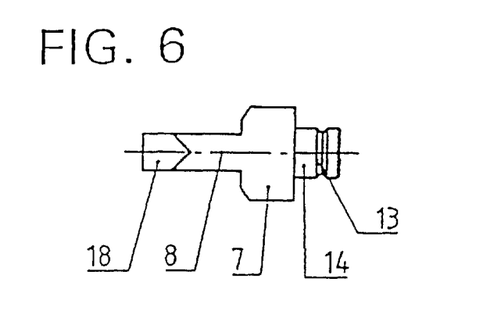
FIG. 6: A projection of the connecting axle.
Figure 7:
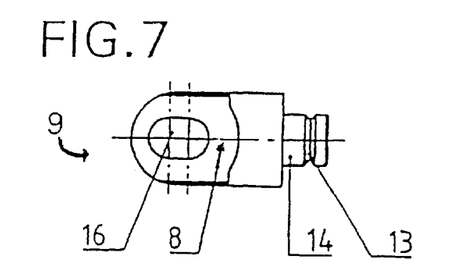
FIG. 7: A top view according to FIG. 6.
Figure 8:
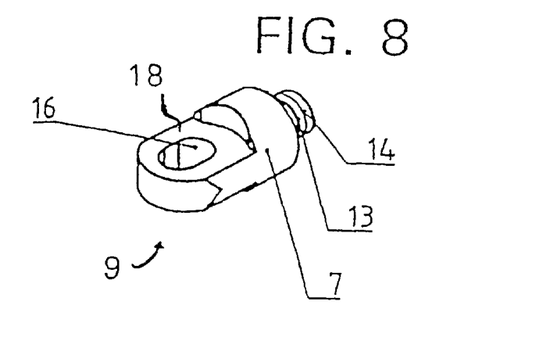
FIG. 8: A perspective representation of the free end of the connecting axle.
Figure 9:
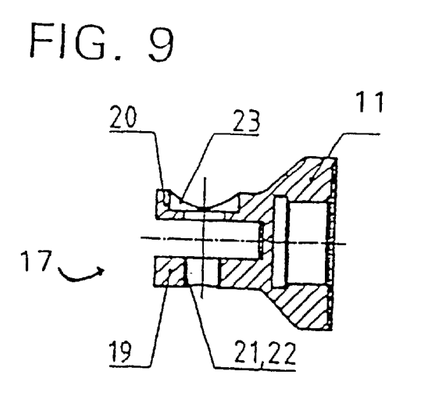
FIG. 9: A sectional view of the adapter element showing part of the connector articulation.
Figure 10:
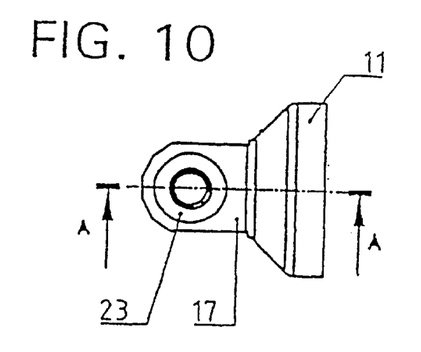
FIG. 10: A top view on the adapter element.

FIGS. 6 through 8 show that the axle journals 14 of the connecting axles 7 present an undercut groove 13, which fits into the locating bearing 6 of the central coupling member 5, into which, in turn, the threaded pin 15 is screwable. FIGS. 7 and 8 also show that a free end 9 of the connecting axles 7 is realized as a bracket 18, the center longitudinal axis of which is identified by 8. The bracket 18 is also provided with an oblong hole 16 and, as shown in FIGS. 9 and 10, engages in a fork 17 which forms half of the connector articulation 10 attached to the glass adapter element 11. The fork 17 is composed of two fork legs 19 and 20, whereby the fork leg 19 is provided with a female threaded 22 borehole 21, into which a clamp screw 24 is screwable. The clamps screw's 24 head (refer to FIG. 1) fits into indentation 23 of the fork leg 20. The connector articulation 10 can be stiffened by means of the clamp screw 24.

Figure 11:
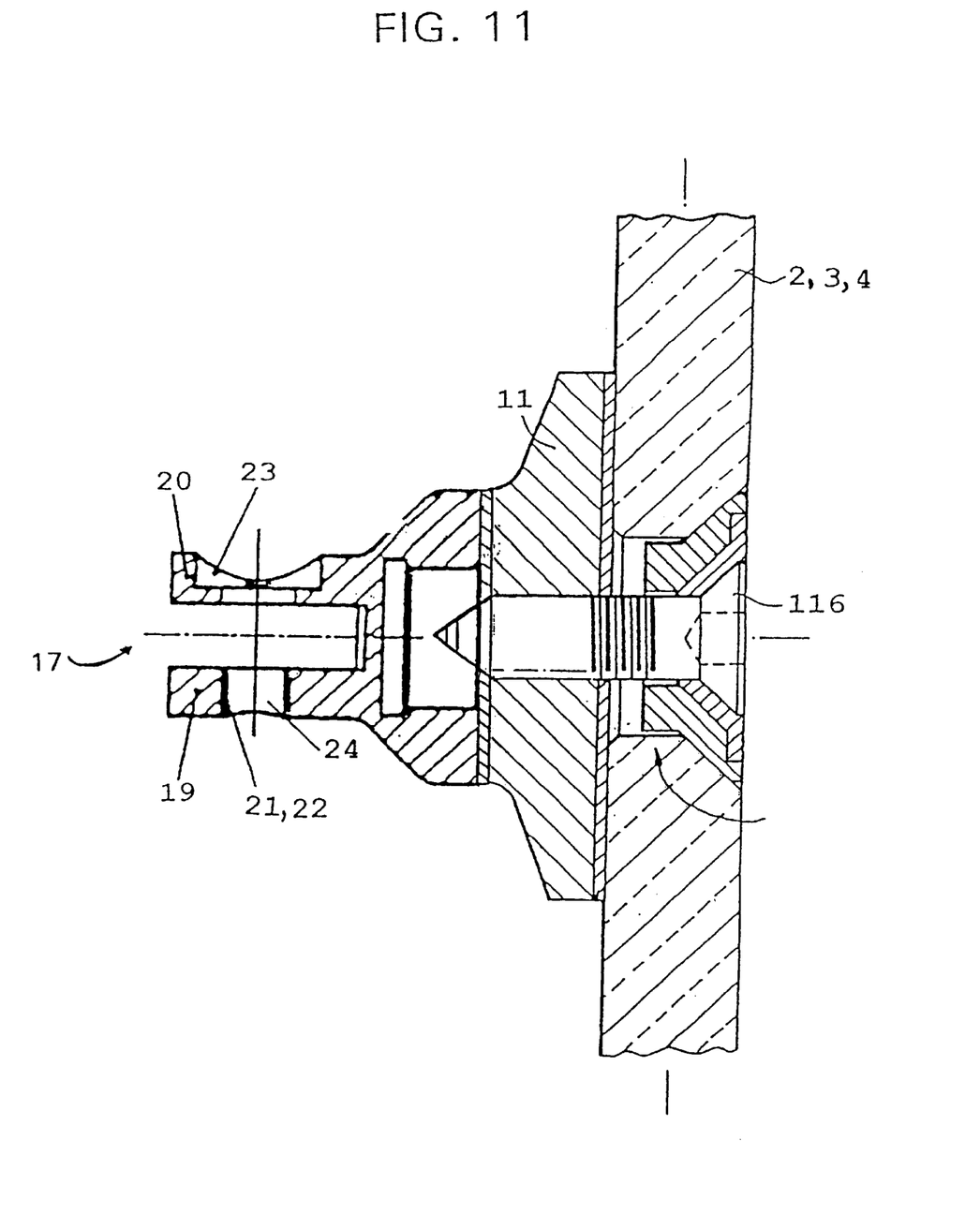
FIG. 11: An enlarged view of part of the connector articulation and the adapter element.

FIG. 11 is an enlarged sectional view of the connector articulation 10 and a glass adapter element 11 that shows where a clamp screw 24 fits into the fork 17 as well as a possible connection of an adapter element 11 to the glass panes, 2, 3, 4. For example, a glass adapter element 11 may be attached to glass panes 2, 3, 4 via fastening screws 116 that are inserted into the adapter elements 11 and connect the clamping fitting 1 to the glass panes 2, 3, and 4.

Figure 12:
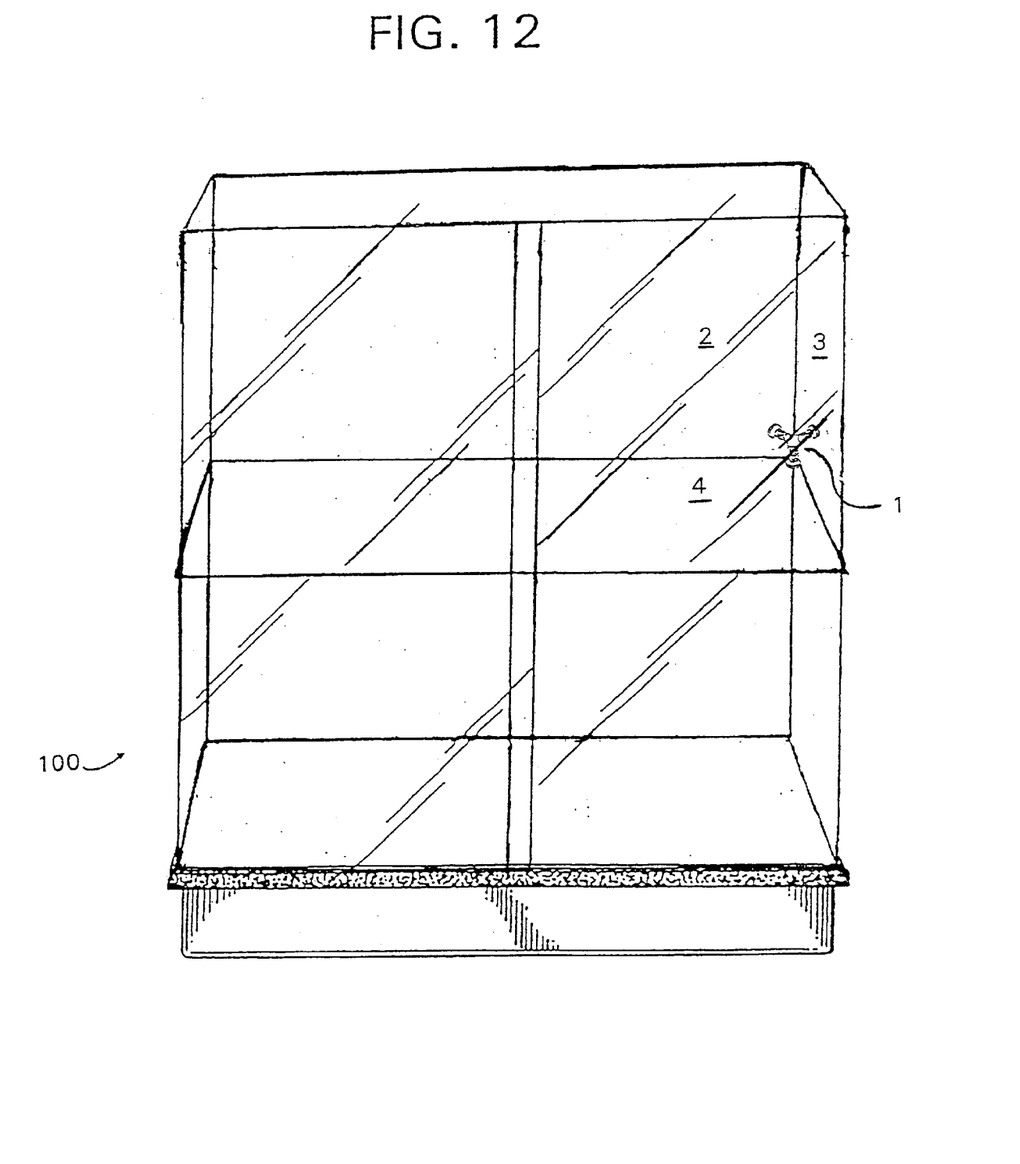
FIG. 12: A general view of a glass display case showing the connection of a clamping fitting.

FIG. 12 shows an example of a glass display case 100 with a clamping fitting 1 forming a corner connection between three adjoining glass panes 2, 3, 4 of the glass display case 100.

One feature of the invention resides broadly in a clamping fitting for the corner connection of three adjoining walls, especially glass panes or the like, characterized in that the clamping fitting 1 presents a central coupling member 5 with three locating bearings 6 for the connecting axles 7, therein rotatably and lockably supported, the center longitudinal axes 8 of which axles run radially with regard to the coupling member 5 and respectively include between each other an angle of approximately 120 degrees, and in that, at their free end 9 opposite to the coupling member 5, the connecting axles 7 present a connector articulation 10 that can be made rigid for the connection of an adapter element, preferably a glass adapter element 11.

Another feature of the invention resides broadly in a clamping fitting characterized in that the coupling member 5 is executed as a sphere.

Still another feature of the invention resides broadly in a clamping fitting characterized in that the locating bearings 6 of the coupling member 5 are realized by three pocket borings 12 offset at an angle of approximately 120 degrees from one another.

Yet another feature of the invention resides broadly in a clamping fitting characterized in that the connecting axles 7 are rotatably supported in the locating bearing 6 of the coupling member 5 by means of an axle journal 14 presenting an undercut groove 13 and are lockable by means of a threaded pin 15 screwable into the coupling member 5 and engaging the groove 13.

A further feature of the invention resides broadly in a clamping fitting characterized in that the connector articulation 10 of the connecting axles 7 consists of a bracket 18 presenting an oblong hole 16 and engaging into a fork 17 of the adapter element 11.

Another feature of the invention resides broadly in a clamping fitting characterized in that a fork leg 19 of the fork 17 of the adapter element 11 presents a boring 21 with a female thread 22 and a fork leg 20 with an indentation 23 for the reception of a clamp screw 24.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following U.S. patents are hereby incorporated by reference as if set forth in their entirety herein: U.S. Pat. No. 6,131,346, having inventor Herbert KORDES, issued on Oct. 17, 2000; and U.S. Pat. No. 6,158,177, having inventor Ernst Udo BLÖBAUM, issued on Dec. 12, 2000.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

Some examples of glass display cases or glass showcases that may be utilized or adapted for use in at least one possible embodiment of the present invention may be found in the following U.S. Pat No. 4,141,610, having inventor Ando, issued on Feb. 27, 1979; U.S. Pat. No. 4,233,966, having inventor Winters, issued on Sep. 23, 1980; No. 4,291,928, having inventor Kiyosawa, issued on Sep. 29, 1981; U.S. Pat. No. 4,255,001, having inventor Frishman, issued on Mar. 10, 1981; U.S. Pat. No. 4,368,936, having inventor Worrallo, issued on Jan. 18, 1983; U.S. Pat. No. 4,381,876, having inventor Fenwick, issued on May 3, 1983; U.S. Pat. No. 4,560,214, having inventor Otema, issued on Dec. 24, 1985; U.S. Pat. No. 4,865,402, having inventor Walter, issued on Sep. 12, 1989; and No. D 373,692, having inventor Staeger, issued on Sep. 17, 1996. The aforementioned patents are hereby incorporated by reference as if set forth in their entirety herein.

Some examples of clamping fittings or connectors that may be utilized or adapted for use in at least one possible embodiment of the present invention may be found in the following U.S. Pat. No. 4,115,966, having inventor DeLee, issued on Sep. 26, 1978; U.S. Pat. No. 4,409,906, having inventor Alneng, issued on Oct. 18, 1983; U.S. Pat. No. 4,731,973, having inventor Stenemann, issued on Mar. 22, 1988; U.S. Pat. No. 6,131,346, having inventor Kordes, issued on Oct. 17, 2000; U.S. Pat. No. 6,158,177, having inventor Blöbaum, issued on Dec. 12, 2000; and U.S. Pat. No. 6,173,545 B1, having inventors Feldpausch et al., issued on Jan. 16, 2001. The aforementioned patents are hereby incorporated by reference as if set forth in their entirety herein.

Some examples of glass facades and mounting or connecting devices for glass facades that may be utilized or adapted for use in at least one possible embodiment of the present invention may be found in the following U.S. Pat. No. 4,793,112, having inventor Süfke, issued on Dec. 27, 1988; U.S. Pat. No. 4,837,996, having inventor Eckelt, issued on Jun. 13, 1989; U.S. Pat. No. 5,301,484, having inventor Jansson, issued on Apr. 12, 1994; U.S. Pat. No. 5,493,831, having inventor Jansson, issued on Feb. 27, 1996; and U.S. Pat. No. 5,524,404, having inventor Lahaye, issued on Jun. 11, 1996. The aforementioned patents are hereby incorporated by reference as if set forth in their entirety herein.

The invention as described herein above in the context of the preferred embodiments is not to be taken as limited to all of the provided details thereof, since modifications and variations thereof may be made without departing from the spirit and scope of the invention.

AT LEAST PARTIAL LIST OF REFERENCES

| | |
|---|---|
| 1 | Clamping fitting |
| 2 | Glass pane |
| 3 | Glass pane |
| 4 | Glass pane |
| 5 | Central coupling member |
| 6 | Locating bearing |
| 7 | Connecting axles |
| 8 | Center longitudinal axes of the connecting axles |
| 9 | Free end of the connecting axles |
| 10 | Stiffening connector articulation |
| 11 | Glass adapter elements |
| 12 | Pocket borings |
| 13 | Undercut groove |
| 14 | Axle journals |
| 15 | Threaded pin |
| 16 | Oblong hole |
| 17 | Fork |
| 18 | Bracket |
| 19 | Fork leg |
| 20 | Fork leg |
| 21 | Borehole |
| 22 | Female thread |
| 23 | Indentation |
| 24 | Clamp screw |
| 25 | Aperture |
| 100 | Glass Display Case |
| 116 | Fastening screw |

What is claimed is:

1. A clamping fitting for the corner connection of three adjoining wall structures, said clamping fitting comprising:
   a central coupling member;
   said central coupling member comprising three locating structures;
   three protruding elements;
   said three protruding elements being rotatably and lockably supported in said three locating structures of said central coupling member;
   each of said three protruding elements being configured to have a center longitudinal axis extending radially from said coupling member;
   said coupling member and said three protruding elements being configured to be disposed such that said center longitudinal axes are at an angle of approximately 120 degrees with respect to one another;
   each of said three protruding elements comprising a free end disposed opposite to said coupling member;
   three articulating connectors;
   each of said three free ends of said three protruding elements being connected to a corresponding one of said three articulating connectors;
   each of said three articulating connectors forming an articulating connection with its corresponding protruding element;
   three fastening structures being configured to be attached to an adjoining wall structure;
   each of said three articulating connectors being attached to a corresponding one of said three fastening structures; and
   three holding elements configured to selectively rigidly connect said three articulating connectors with their corresponding protruding elements.

2. The clamping fitting according to claim 1, wherein: said coupling member comprises a spherical body.

3. The clamping fitting according to claim 2, wherein: said three locating structures of said coupling member comprise three pocket borings offset at an angle of approximately 120 degrees from one another.

4. The clamping fitting according to claim 3, wherein:

said three protruding elements have axle journals;

said three protruding elements are rotatably supported in said three locating structures of said coupling member by said axle journals;

said axle journals comprise undercut grooves;

said axle journals are configured to be lockable by means of threaded screws and;

said threaded screws are configured to screw into said coupling member and engage said grooves to hold said three protruding elements in said coupling member to prevent said three protruding elements from rotating once adjustment to said three wall structures has been made.

5. The clamping fitting according to claim 4, wherein:

each of said three free ends of said three protruding elements comprises a tongue member;

each of said tongue members comprises an oblong hole;

each of said three articulating connectors comprises a forked portion; and each of said tongue members is disposed to connect with a corresponding one of said forked portions.

6. Clamping fitting according to claim 5, wherein:

said forked members of said three articulating connectors comprise two fork legs;

said two fork legs comprise a first fork leg and a second fork leg;

said first fork leg has a hole;

said hole of said first fork leg has a female thread;

said second fork leg has an indentation;

each of said three holding elements is disposed in a corresponding indentation of said second fork leg, said hole of said first fork leg, and said oblong hole of said three tongue members of said three protruding elements; and said holding elements are configured to tighten said articulating connections formed by said three articulating connectors and said three protruding elements.

7. A combination of the clamping fitting according to claim 1, and a glass display case:

said glass display case comprising at least three glass panes;

said at least three glass panes being disposed adjacent to one another to form an inner corner in said glass display case;

each of said at least three glass panes being configured to receive and connect to one of said fastening structures; and said fastening structures connecting said at least three glass panes together.

8. A kit to make a clamping fitting for the corner connection of three adjoining wall structures, said kit comprising:

a central coupling member;

said coupling member comprising locating structures;

protruding elements;

said protruding elements being configured to be rotatably and lockably supported in said locating structures of said central coupling member;

said protruding elements being configured to have center longitudinal axes extending radially from said central coupling member;

said coupling member and said protruding elements being configured to be disposed such that said center longitudinal axes are at an angle of approximately 120 degrees with respect to one another;

each of said protruding elements comprising a free end configured to be disposed opposite to said coupling member;

articulating connectors;

each of said free ends of said protruding elements being configured to be connected to a corresponding one of said articulating connectors;

said articulating connectors being configured to form an articulating connection with said protruding elements;

fastening structures being configured to be attached to an adjoining wall structure;

each of said articulating connectors being configured to be attached to a corresponding one of said fastening structures;

holding elements configured to selectively rigidly connect said articulating connectors with their corresponding protruding elements.

9. The kit to make a clamping fitting according to claim 8, wherein:

said coupling member comprises a spherical body.

10. The kit to make a clamping fitting according to claim 9, wherein:

said locating structures of said coupling member comprise pocket borings configured to be offset at an angle of approximately 120 degrees from one another.

11. The kit to make a clamping fitting according to claim 10, wherein:

said protruding elements have axle journals;

said protruding elements are configured to be rotatably supported in said locating structures of said coupling member by said axle journals;

said axle journals comprise undercut grooves;

said axle journals are configured to be lockable by means of threaded screws; and said threaded screws are configured to screw into said coupling member and engage said undercut grooves to hold said protruding elements in said coupling member to prevent said protruding elements from rotating once adjustment to said wall structures has been made.

12. The kit to make a clamping fitting according to claim 11, wherein:

each of said free ends of said protruding elements comprises a tongue member;

each of said tongue members comprises an oblong hole;

each of said articulating connectors comprises a forked portion; and each of said tongue members is configured to connect with a corresponding one of said forked portions.

13. The kit to make a clamping fitting according to claim 12, wherein:

each of said forked portions of said articulating connectors comprises two fork legs;

said two fork legs comprise a first fork leg and a second fork leg;

said first fork leg has a hole;

said hole of said first fork leg has a female thread;

said second fork leg has an indentation;

each of said holding elements is configured to be disposed in a corresponding indentation of said second fork leg, said hole of said first fork leg, and said oblong hole of said tongue member; and said holding elements are configured to tighten said articulating connections formed by said connectors and said protruding elements.

14. A combination of the kit to make a clamping fitting according to claim 8 and a glass display case:
said glass display case comprising at least three glass panes;
said at least three glass panes being configured to be disposed adjacent to one another to form an inner corner in said glass display case;
each of said at least three glass panes being configured to receive and connect to one of said fastening structures; and
said fastening structures being configured to connect said at least three glass panes together.

15. A method of using a kit comprising a clamping fitting for the corner connection of three adjoining glass wall structures to build a glass display case, said kit comprising: a central coupling member; said central coupling member comprising locating structures; protruding elements; said protruding elements being configured to be rotatably and lockably supported in said locating structures of said central coupling member; said protruding elements being configured to have center longitudinal axes extending radially from said coupling member; said coupling member and said protruding elements being configured to be disposed such that said center longitudinal axes are at an angle of approximately 120 degrees with respect to one another; each of said protruding elements comprising a free end configured to be disposed opposite to said coupling member; articulating connectors; each of said free ends of said protruding elements being configured to be connected to a corresponding one of said articulating connectors; said articulating connectors being configured to form an articulating connection with said protruding elements; fastening structures being configured to be attached to an adjoining wall structure; each of said articulating connectors being configured to attach to a corresponding one of said fastening structures; holding elements configured to selectively rigidly connect said articulating connectors with their corresponding protruding elements; said glass display case comprising at least three glass panes; said at least three glass panes being configured to be disposed adjacent to one another to form an inner corner in said glass display case; each of said at least three glass panes comprising a hole being configured to receive and connect to one of said fastening structures; and said fastening structures being configured to connect said at least three glass panes together;
said method comprising the steps of:
attaching said protruding elements to said locating structures of said coupling member so that said center longitudinal axes of said protruding elements are disposed at an angle of approximately 120 degrees with respect to one another and said free ends of said protruding elements are disposed opposite to said coupling member;
fitting said protruding elements into said articulating connectors;
inserting said holding elements into their corresponding articulating connectors and protruding elements;
arranging said glass panes of said glass display case so that said glass panes are disposed adjacent to one another to form an inner corner in said glass display case;
aligning said articulating connectors with said holes in said at least three glass panes;
inserting said fastening structures into said holes in said at least three glass panes;
attaching said fastening structures to said articulating connectors; and
building a glass display case.

16. The method of using a kit comprising a clamping fitting for the corner connection of three adjoining glass wall structures to build a glass display case according to claim 15, wherein said coupling member of said kit comprises a spherical body.

17. The method of using a kit comprising a clamping fitting for the corner connection of three adjoining glass wall structures to build a glass display case according to claim 16, wherein said locating structures of said coupling member comprise pocket borings configured to be offset at an angle of approximately 120 degrees from one another.

18. The method of using a kit comprising a clamping fitting for the corner connection of three adjoining glass wall structures to build a glass display case according to claim 17, wherein said protruding elements of said kit have axle journals; said protruding elements are configured to be rotatably supported in said locating structures of said coupling member by said axle journals; said axle journals comprise undercut grooves; said axle journals are configured to be lockable by means of said threaded screws; and said threaded screws are configured to screw into said locating structures of said coupling member and engage said undercut grooves to hold said protruding elements in said coupling member to prevent said protruding elements from rotating once adjustment to said glass wall structures has been made;
said method further comprises the steps of:
inserting said axle journals of said protruding elements into said locating structures of said coupling member; and
inserting said threaded screws into said coupling member to permit said threaded screws to engage said undercut grooves.

19. The method of using a kit comprising a clamping fitting for the corner connection of three adjoining glass wall structures to build a glass display case according to claim 18, wherein each of said free ends of said protruding elements of said kit comprises a tongue member; each of said tongue members comprises an oblong hole; each of said articulating connectors of said kit comprises a forked portion; and said tongue members being configured to connect with said forked portions;
said method further comprises the step of inserting said tongue members of said protruding elements into said forked portions of said articulating connectors.

20. The method of using a kit comprising a clamping fitting for the corner connection of three adjoining glass wall structures to build a glass display case according to claim 19, wherein each of said forked portions of said articulating connectors of said kit comprises two fork legs; said two fork legs comprise a first fork leg and a second fork leg; said first fork leg has a hole; said hole of said first fork leg has a female thread; said second fork leg has an indentation; each of said holding elements comprises a clamp screw being configured to be disposed in a corresponding indentation of said second fork leg, said hole of said first fork leg, and said oblong hole of said tongue member; fastening screws; and said fastening screws being configured to connect said fastening structures through said holes in said glass panes and to tighten said fastening structures in said glass panes;
said method further comprising the steps of:
inserting said clamp screws into their corresponding said indentations of said second fork leg, said holes of said first fork leg, and said oblong holes of said tongue members to connect said protruding elements to said articulating connectors;

tightening said fastening screws to connect said fastening structures to said glass panes;

tightening said clamp screws to secure said articulating connections between said articulating connectors and said protruding elements; and tightening said threaded screws to prevent said protruding elements from rotating in said coupling member.

* * * * *